United States Patent
Russell et al.

(10) Patent No.: US 12,353,115 B2
(45) Date of Patent: Jul. 8, 2025

(54) RECONFIGURABLE CAMERA MOUNT

(71) Applicant: GoPro, Inc., San Mateo, CA (US)

(72) Inventors: Edward Gordon Russell, San Francisco, CA (US); Bessy Wen-Han Liang, San Jose, CA (US); Matthew Masao Tonokawa, Kailua, HI (US); Jordan Zook Todd, Piedmont, CA (US)

(73) Assignee: GoPro, Inc., San Mateo, CA (US)

( * ) Notice: Subject to any disclaimer, the term of this patent is extended or adjusted under 35 U.S.C. 154(b) by 134 days.

(21) Appl. No.: 18/130,629

(22) Filed: Apr. 4, 2023

(65) Prior Publication Data
US 2023/0324772 A1 Oct. 12, 2023

Related U.S. Application Data

(60) Provisional application No. 63/328,572, filed on Apr. 7, 2022.

(51) Int. Cl.
*G03B 17/56* (2021.01)
(52) U.S. Cl.
CPC .................. *G03B 17/561* (2013.01)
(58) Field of Classification Search
CPC .............. G03B 17/561; F16M 13/00
See application file for complete search history.

(56) References Cited

U.S. PATENT DOCUMENTS

| | | | | |
|---|---|---|---|---|
| 5,083,344 | A * | 1/1992 | Pettit | E05D 15/44 16/371 |
| 12,180,985 | B2 * | 12/2024 | Pasternak | F16B 5/10 |
| 2003/0085244 | A1 * | 5/2003 | Parsons | F41C 33/045 224/914 |
| 2015/0020352 | A1 * | 1/2015 | Funger | A47C 31/11 24/301 |
| 2016/0360871 | A1 * | 12/2016 | Schessel | F16B 2/005 |

OTHER PUBLICATIONS

Uogw, Uogw 2 Pack Flexible Tripod for Blink XT, Blink XT2, Blink Mini, All-New Blink Outdoor, Wall Mount Bracket, . . . https://www.amazon.com/Uogw-Flexible-Security-Wherever-Tools-Black/dp/B0836D48TS/ref=asc_df_B0836D48TS/?tag=hyprod-20 &linkCode=df0& . . . 10 pages, printed Nov. 17, 2021.

* cited by examiner

*Primary Examiner* — Noam Reisner
(74) *Attorney, Agent, or Firm* — Young Basile Hanlon & MacFarlane, P.C.

(57) ABSTRACT

A camera mount, comprising: a base and a bottom. The bottom is movably connected to the base. The bottom includes recesses configured to receive flexible fasteners. The bottom and the base are movable to a closed position where the recesses are inaccessible and the flexible fasteners are held between the base and the bottom and an open position where the recesses are exposed so that the flexible fasteners are at least one of insertable, removable, or interchangeable.

20 Claims, 10 Drawing Sheets

RECONFIGURABLE CAMERA MOUNT

CROSS-REFERENCE TO RELATED APPLICATION(S)

This application claims priority to and the benefit of U.S. Provisional Application Patent Ser. No. 63/328,572, filed Apr. 7, 2022, the entire disclosure of which is hereby incorporated by reference.

TECHNICAL FIELD

This disclosure relates to a camera mount that is reconfigurable to removably accept flexible ties so that the flexible ties can be changed, and the camera mount can attach a camera to any structure such as a structure with an irregular shape.

BACKGROUND

Generally, cameras are available that are capable of capturing both images and videos. These cameras may be set up at various locations to capture an event over a period of time. A given camera may be connected to a mount that supports the camera so that the camera can capture the event. The mount that supports the camera can generally rest on a planar surface (e.g., the ground or a table).

SUMMARY

Disclosed herein are implementations of an apparatus that connects and supports a camera relative to a structure. The teachings herein provide a mount that mounts a camera to irregular structures in addition to planar structures. The mount is configured to receive different length and shape flexible ties so that the mount is reconfigurable to accommodate different sized structures.

The present teachings provide: a camera mount, comprising: a base and a bottom. The bottom is movably connected to the base. The bottom includes recesses configured to receive flexible fasteners. The bottom and the base are movable to a closed position where the recesses are inaccessible and the flexible fasteners are held between the base and the bottom and an open position where the recesses are exposed so that the flexible fasteners are at least one of insertable, removable, or interchangeable.

The present teachings provide: a camera mount, comprising: a base and a bottom. The bottom is movably connected to the base. The bottom comprises: recesses and locks. The recesses are configured to receive flexible fasteners. The locks are configured to restrict movement of the flexible fasteners relative to the recesses. The bottom and the base are movable between an open position where the recesses are exposed and a closed position wherein the recesses are covered.

The present teachings provide: a camera mount, comprising: a base; a bottom; and a swivel. The swivel located between and movably connecting the base and the bottom. The recesses are located within the bottom, wherein the recesses are configured to receive flexible fasteners. The bottom and the base are movable between an open position where the recesses are exposed and a closed position wherein the recesses are covered.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present teachings provide a camera mount to hold an image capture device that captures videos and audio related to the video. The camera mount may connect to virtually any structure and especially irregularly shaped structures. The camera mount may include connection devices that are conformable to irregularly shaped structures. The connection devices may be added and removed from the camera mount. The connection devices may be movable within the camera mount, recesses in the camera mount, or both. The irregular shaped objects may be a fence, a post, a bike handle, a wrist, a surfboard, or a combination thereof.

Figure 1A:
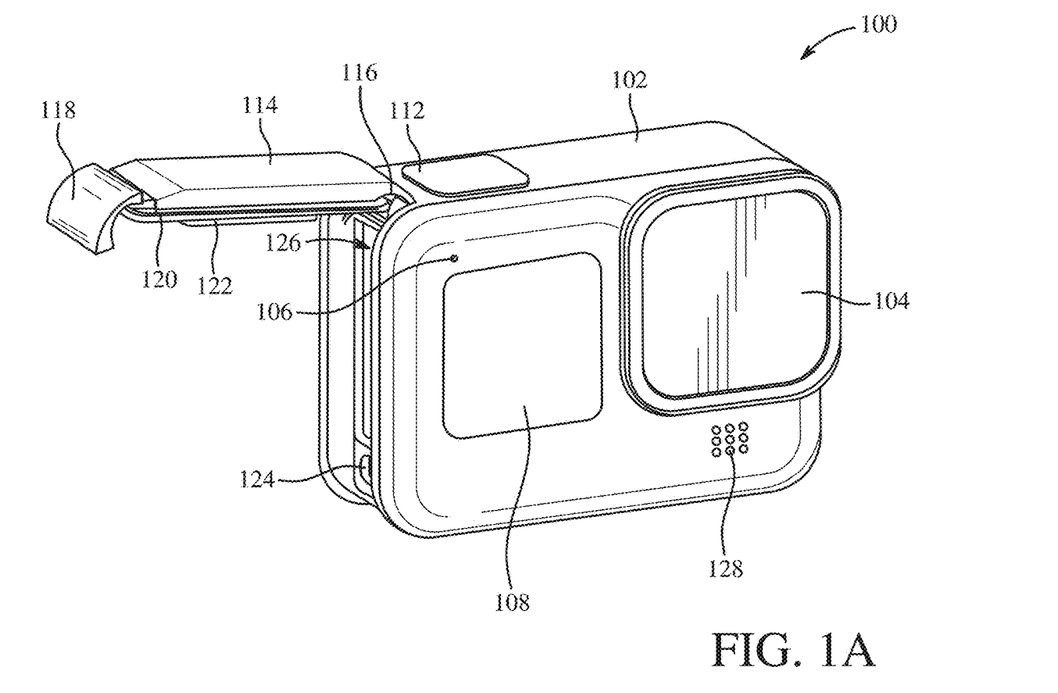
FIGS. 1A-B are isometric views of an example of an image capture device.
Figure 1B:
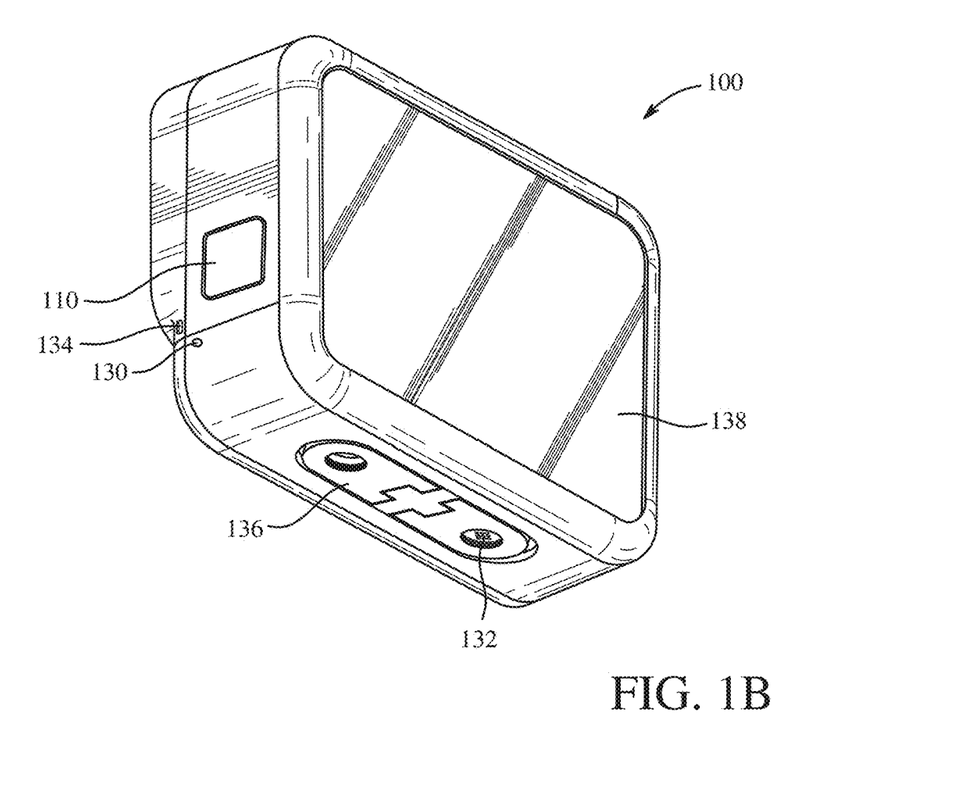

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2:
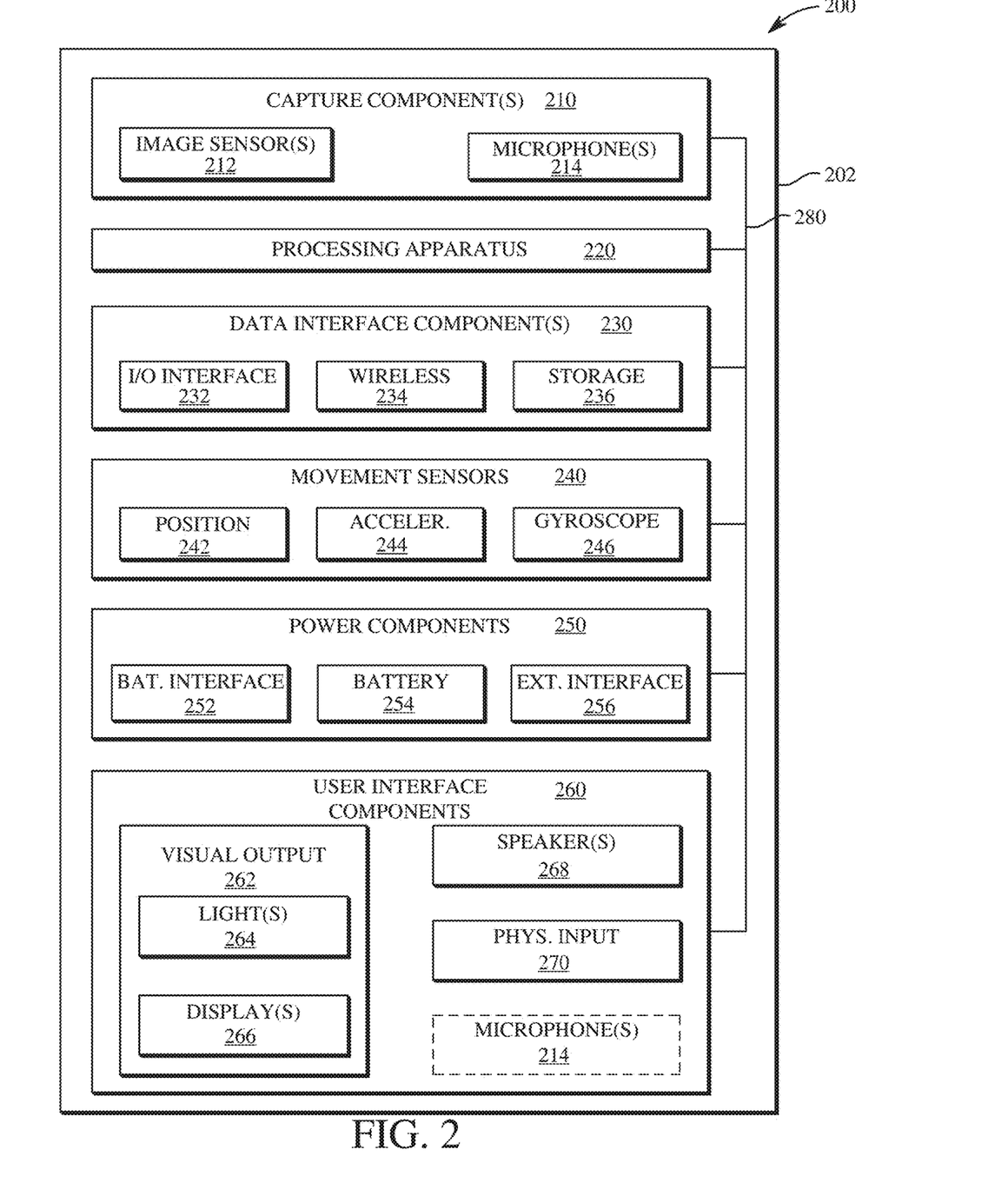
FIG. 2 is a block diagram of electronic components of an image capture device.

FIG. 2 is a block diagram of electronic components in an image capture device 200. The image capture device 200 may be a single-lens image capture device, a multi-lens image capture device, or variations thereof, including an image capture device with multiple capabilities such as use of interchangeable integrated sensor lens assemblies. The description of the image capture device 200 is also applicable to the image capture device 100 of FIGS. 1A-B.

The image capture device 200 includes a body 202 which includes electronic components such as capture components 210, a processing apparatus 220, data interface components 230, movement sensors 240, power components 250, and/or user interface components 260.

The capture components 210 include one or more image sensors 212 for capturing images and one or more microphones 214 for capturing audio.

The image sensor(s) 212 is configured to detect light of a certain spectrum (e.g., the visible spectrum or the infrared spectrum) and convey information constituting an image as electrical signals (e.g., analog or digital signals). The image sensor(s) 212 detects light incident through a lens coupled or connected to the body 202. The image sensor(s) 212 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 212 may be passed to other electronic components of the image capture device 200 via a bus 280, such as to the processing apparatus 220. In some implementations, the image sensor(s) 212 includes a digital-to-analog converter. A multi-lens variation of the image capture device 200 can include multiple image sensors 212.

The microphone(s) 214 is configured to detect sound, which may be recorded in conjunction with capturing images to form a video. The microphone(s) 214 may also detect sound in order to receive audible commands to control the image capture device 200.

The processing apparatus 220 may be configured to perform image signal processing (e.g., filtering, tone mapping, stitching, and/or encoding) to generate output images based on image data from the image sensor(s) 212. The processing apparatus 220 may include one or more processors having single or multiple processing cores. In some implementations, the processing apparatus 220 may include an application specific integrated circuit (ASIC). For example, the processing apparatus 220 may include a custom image signal processor. The processing apparatus 220 may exchange data (e.g., image data) with other components of the image capture device 200, such as the image sensor(s) 212, via the bus 280.

The processing apparatus 220 may include memory, such as a random-access memory (RAM) device, flash memory, or another suitable type of storage device, such as a non-transitory computer-readable memory. The memory of the processing apparatus 220 may include executable instructions and data that can be accessed by one or more processors of the processing apparatus 220. For example, the processing apparatus 220 may include one or more dynamic random-access memory (DRAM) modules, such as double data rate synchronous dynamic random-access memory (DDR SDRAM). In some implementations, the processing apparatus 220 may include a digital signal processor (DSP). More than one processing apparatus may also be present or associated with the image capture device 200.

The data interface components 230 enable communication between the image capture device 200 and other electronic devices, such as a remote control, a smartphone, a tablet computer, a laptop computer, a desktop computer, or a storage device. For example, the data interface components 230 may be used to receive commands to operate the image capture device 200, transfer image data to other electronic devices, and/or transfer other signals or information to and from the image capture device 200. The data interface components 230 may be configured for wired and/or wireless communication. For example, the data interface components 230 may include an I/O interface 232 that provides wired communication for the image capture device, which may be a USB interface (e.g., USB type-C), a high-definition multimedia interface (HDMI), or a FireWire interface. The data interface components 230 may include a wireless data interface 234 that provides wireless communication for the image capture device 200, such as a Bluetooth interface, a ZigBee interface, and/or a Wi-Fi interface. The data interface components 230 may include a storage interface 236, such as a memory card slot configured to receive and operatively couple to a storage device (e.g., a memory card) for data transfer with the image capture device 200 (e.g., for storing captured images and/or recorded audio and video).

The movement sensors 240 may detect the position and movement of the image capture device 200. The movement sensors 240 may include a position sensor 242, an accelerometer 244, or a gyroscope 246. The position sensor 242, such as a global positioning system (GPS) sensor, is used to determine a position of the image capture device 200. The accelerometer 244, such as a three-axis accelerometer, measures linear motion (e.g., linear acceleration) of the image capture device 200. The gyroscope 246, such as a three-axis gyroscope, measures rotational motion (e.g., rate of rotation) of the image capture device 200. Other types of movement sensors 240 may also be present or associated with the image capture device 200.

The power components 250 may receive, store, and/or provide power for operating the image capture device 200. The power components 250 may include a battery interface 252 and a battery 254. The battery interface 252 operatively couples to the battery 254, for example, with conductive contacts to transfer power from the battery 254 to the other electronic components of the image capture device 200. The power components 250 may also include an external interface 256, and the power components 250 may, via the external interface 256, receive power from an external source, such as a wall plug or external battery, for operating the image capture device 200 and/or charging the battery 254 of the image capture device 200. In some implementations, the external interface 256 may be the I/O interface 232. In such an implementation, the U/O interface 232 may enable the power components 250 to receive power from an external source over a wired data interface component (e.g., a USB type-C cable).

The user interface components 260 may allow the user to interact with the image capture device 200, for example, providing outputs to the user and receiving inputs from the user. The user interface components 260 may include visual output components 262 to visually communicate information and/or present captured images to the user. The visual output components 262 may include one or more lights 264 and/or more displays 266. The display(s) 266 may be configured as a touch screen that receives inputs from the user. The user interface components 260 may also include one or more speakers 268. The speaker(s) 268 can function as an audio output component that audibly communicates information and/or presents recorded audio to the user. The user interface components 260 may also include one or more physical input interfaces 270 that are physically manipulated by the user to provide input to the image capture device 200. The physical input interfaces 270 may, for example, be configured as buttons, toggles, or switches. The user interface components 260 may also be considered to include the microphone(s) 214, as indicated in dotted line, and the microphone(s) 214 may function to receive audio inputs from the user, such as voice commands.

The image capture device 100, 200 may be connected to a structure by a camera mount, such as the camera mount described in FIGS. 3A-5B.

Figure 3A:
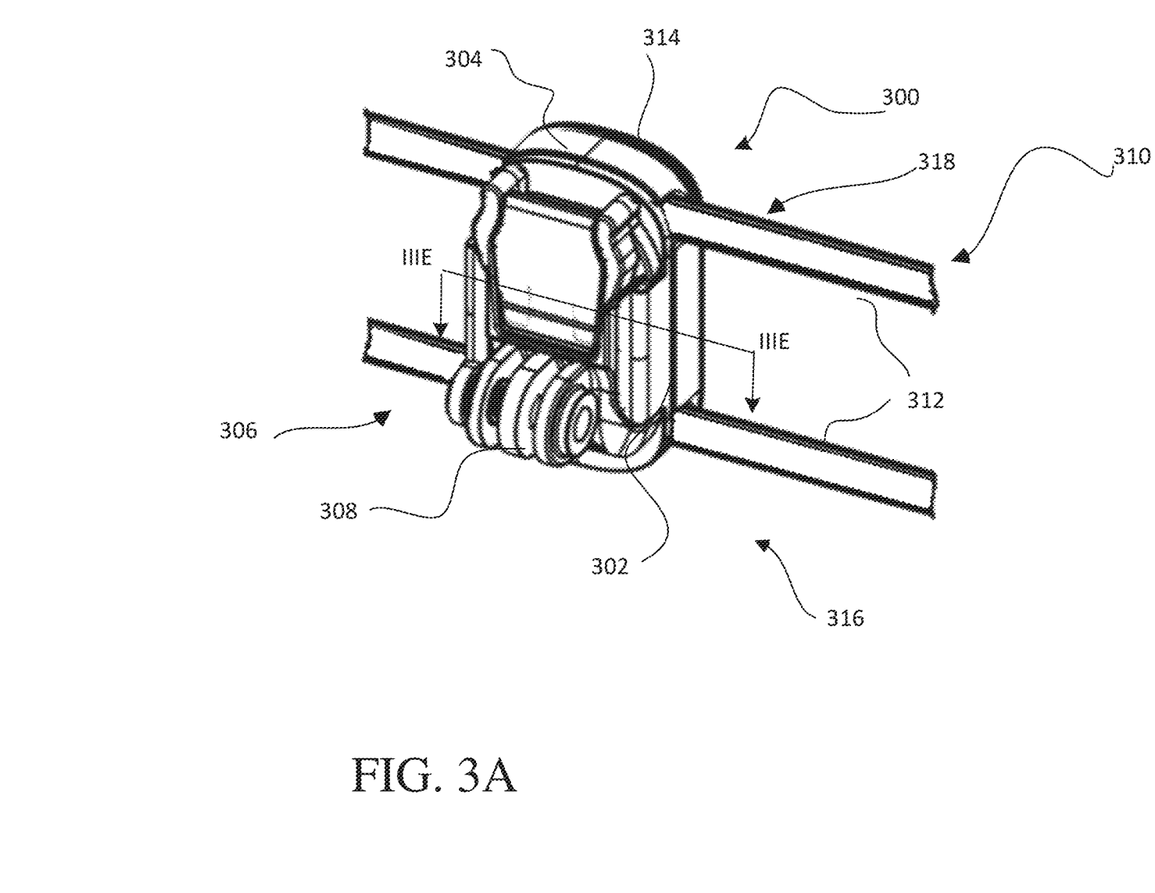
FIG. 3A is a perspective view of a camera mount in a locked position to retain flexible ties.

FIG. 3A is an isometric view of a camera mount 300 of the teachings herein. The camera mount 300 is connectable to an image capture device 100 so that the image capture device may be positioned to record events of interest. The camera mount 300 may have a shape that is generally square, round, oval, stadium, symmetrical, asymmetrical, geometric, non-geometric, or a combination thereof. The camera mount 300 may be sufficiently large such that the camera mount 300 may support a camera such as the image capture devices 100, 200. The camera mount 300 includes a base 302 and a bottom 304 that are movable relative to one another.

The base 302 includes a connector 306 to connect the camera mount 300 to an image capture device 100, 200. The connector 306 may directly connect or indirectly connect to the image capture device 100, 200. The connector 306 may form a connection with the image capture device 100, 200 or a connection part connected to the image capture device 100, 200 so that the image capture device 100, 200 is securely connected to the camera mount 300. The connector 306 is depicted as having protrusions 308 that are configured to connect the camera mount 300 to the image capture device 100, 200. The protrusions 308 extend outward from the base 302 and include through holes that align with through holes of part of the image capture device 100, 200 so that a pin 309 may extend through to form a fixed connection with the protrusions 308 of the camera mount 300. The pin 309 may be any device that removably connects the camera mount 300 to the image capture device 100, 200. While the protrusions 308 hold the image capture device 100, 200, the base 302 and the bottom 304 may be rotated relative to one another to align the image capture device 100, 200 with a feature of interest. Connection devices 310 may be located, such as captured or sandwiched, between the base 302 and the bottom 304 as shown in FIG. 3A.

The connection devices 310 function to connect the camera mount 300 to virtually any structure. By the connection devices 310 connecting the camera mount 300 to a structure, the image capture device 100, 200 may also be connected to the structure. The connection devices 310 may be reconfigurable so that the connection devices 310 may connect to a structure with an irregular shape, a random shape, a symmetrical shape, an asymmetrical shape, spaces, holes, or a combination thereof. For example, the connection devices 310 may connect to a fence or a pole. The connection devices 310 may be fully or partially malleable. The connection devices 310 may be rigid or include a rigid region. The connection devices 310 may be or include a coated metal, a spring steel, nitinol, rubber, plastic, copper, steel, a woven metal, or a combination thereof. The connection devices 310 have a length. The length of the connection devices 310 may vary or be varied based upon a need of the user. The length of the connection devices 310 may be about 3 cm or more, about 5 cm or more, about 10 cm or more, or about 20 cm or more. The length of the connection devices may be about 1 m or less, about 75 cm or less, or about 50 cm or less. The connection devices 310 may be flexible members 312.

The flexible members 312 may be movable to complement a shape of a structure to which the camera mount 300 connects. The flexible members 312 may be movable relative to the camera mount 300, within the camera mount 300, or both. The flexible members 312 may be flexed to accommodate a structure with a cross-sectional thickness (e.g., diameter) of about 1 cm or less, about 7 mm or less, about 5 mm or less, or about 3 mm or less so that the flexible members 312 connect the camera mount 300 to the structure. The flexible members 312 may be twisted, tied, wrapped, or a combination thereof to hold the camera mount 300 in place. The flexible members 312 may me moved so that a surface 314 of the camera mount 300 contacts a structure without a need for the flexible members 312 to contact the structure.

The surface 314 may function to hold the camera mount 300 in communication with a flat structure, a planar structure, structures with a small incline (e.g., 25 degrees or less, 15 degrees or less, or 5 degrees or less relative to the ground), a structure that does not need the flexible members 312, or a combination thereof. The surface 314 may be made of or include rubber, an elastomer, plastic, a flexible material, a non-slip material, raised pieces, or a combination thereof. The surface 314 may support the camera mount 300 while preventing movement of the camera mount 300 relative to a structure. For example, the camera mount 300 may be placed on a dashboard of a vehicle and the surface 314 may prevent the camera mount 300 from sliding during starting and stopping of the vehicle. The surface 314 may create friction or be made of a material with a high coefficient of friction (e.g., rubber, elastic, silicone) so that a user may move the base 302 relative to the bottom 304 to move the camera mount 300 into a locked position 316 as shown.

In the locked position 316, the base 302 and the bottom 304 are substantially aligned in all directions so that the connection devices 310 are retained therebetween. The locked position 316 may allow the connection devices 310 to be moved in a longitudinal direction (e.g., a direction of a length of the connection devices 310) so that a length of the connection devices 310 on each side of the camera mount 300 may be adjusted; rotated about a longitudinal axis (e.g., an axis that runs in the longitudinal direction); or both. The locked position 316 may prevent the connection devices 310 from moving orthogonally relative to the base 302, the bottom 304, or both. The locked position 316 may prevent orthogonal movement, lateral movement, or both but may allow rotational movement, longitudinal movement, or both. The locked position 316 may prevent any movement of the connection devices 310 relative to the camera mount 300. The locked position 316 may be a position where the base 302 is moved to cover the bottom 304 so that recesses 318 in the bottom 304 to hold, house, or otherwise support the connections devices 310 are covered and the connection devices 310 are retained within the recesses 318. In the locked position 316, ends of the connection devices 310 may extend out of the recesses 318. In the locked position 316, a central portion of the connection devices 310 may be located within the recesses 318.

The recesses 318 function to retain a portion of the connection devices 310. The recesses 318, when covered by the base 302, may prevent the connection devices 310 from being removed. The recesses 318 may extend from a first side of the camera mount 300 to a second side of the camera mount 300, forming a through hole. The recesses 318 may have a shape that is complementary to a shape of the connection devices 310. The recesses 318 may have a cross section that is U-shaped, C-shaped, V-shaped, M-shaped, W-shaped, rectangular, square, or a combination thereof. The recesses 318 may be substantially deep to fit the connection devices 310 therein so that the base 302 covers the recesses 318 and the connection devices 310. The recesses 318 may be located entirely in the base 302 or entirely in the bottom 304. A portion of the recesses 318 may be located in the base 302 and a portion of the recesses 318 may be located within the bottom 304. The recesses 318 may retain the connection devices 310 so that the camera mount 300 may be mounted to support an image capture device 100, 200.

Figure 3B:
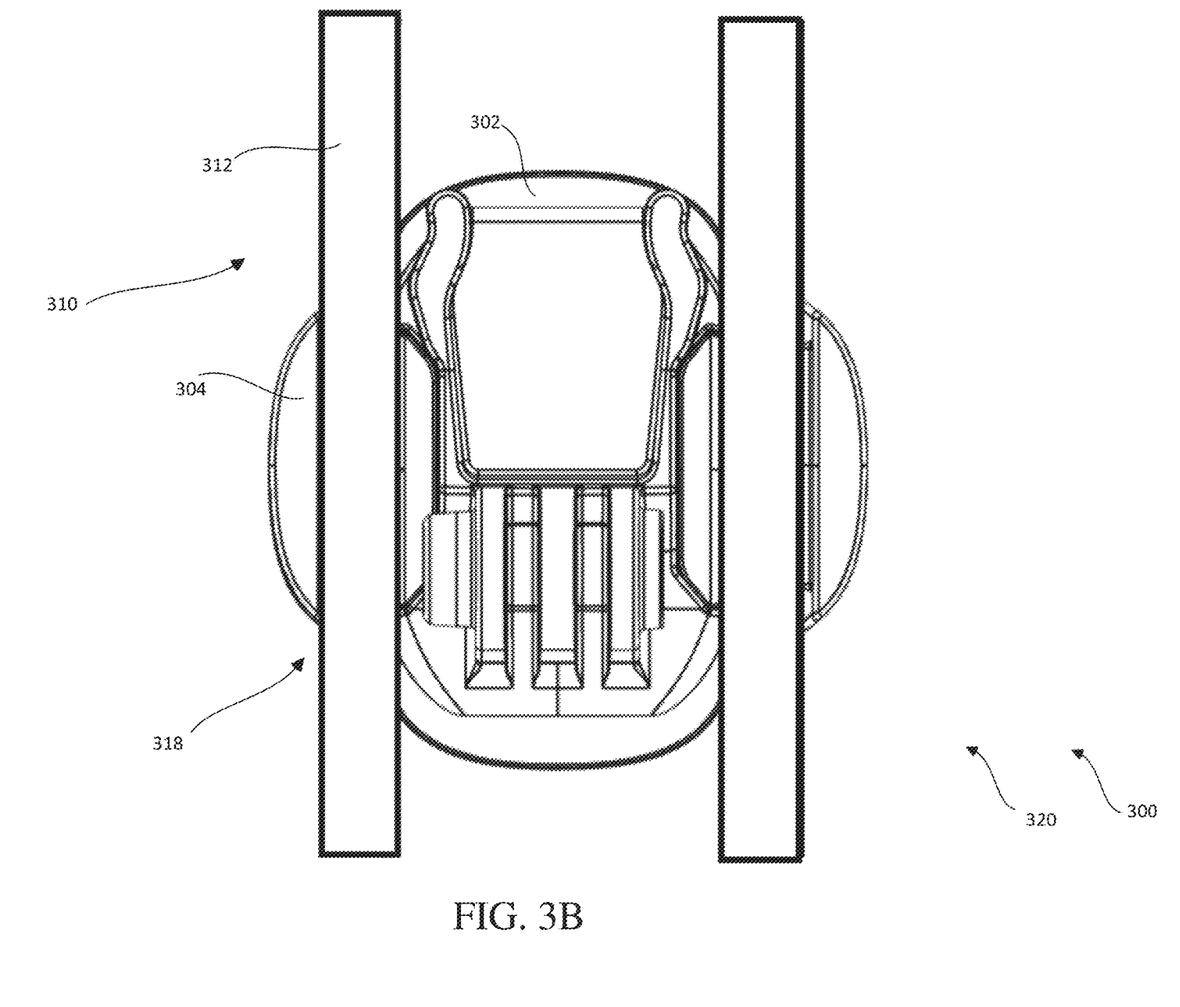
FIG. 3B is a top plan view of the camera mount of FIG. 3A in an unlocked position exposing the flexible ties.

FIG. 3B is a top view of the camera mount 300 with the base 302 and the bottom 304 moved relative to each other forming an unlocked position 320. In the unlocked position 320, the base 302 and the bottom 304 are positioned perpendicular to one another exposing the recesses 318 and the connection devices 310 depicted as flexible members 312. The unlocked position 320 exposes the recesses 318 so that the connection devices 310 may be added or removed. The connection devices 310 may be removed by moving the base 302 in a direction orthogonal to the bottom 304 (e.g., by pulling up) or vice versa. The recesses 318 may be fully exposed in the unlocked position 320. The connection devices 310 may only be removed when the camera mount 300 is in the unlocked position 320 shown, that is, when rotation is present between the base 302 and the bottom 304. The unlocked position 320 may be formed by rotating the base 302 and bottom 304 relative to each other. The width of the base 302 may fit between the recesses 318 in the unlocked position 320 so that the recesses 318 are exposed.

Figure 3C:
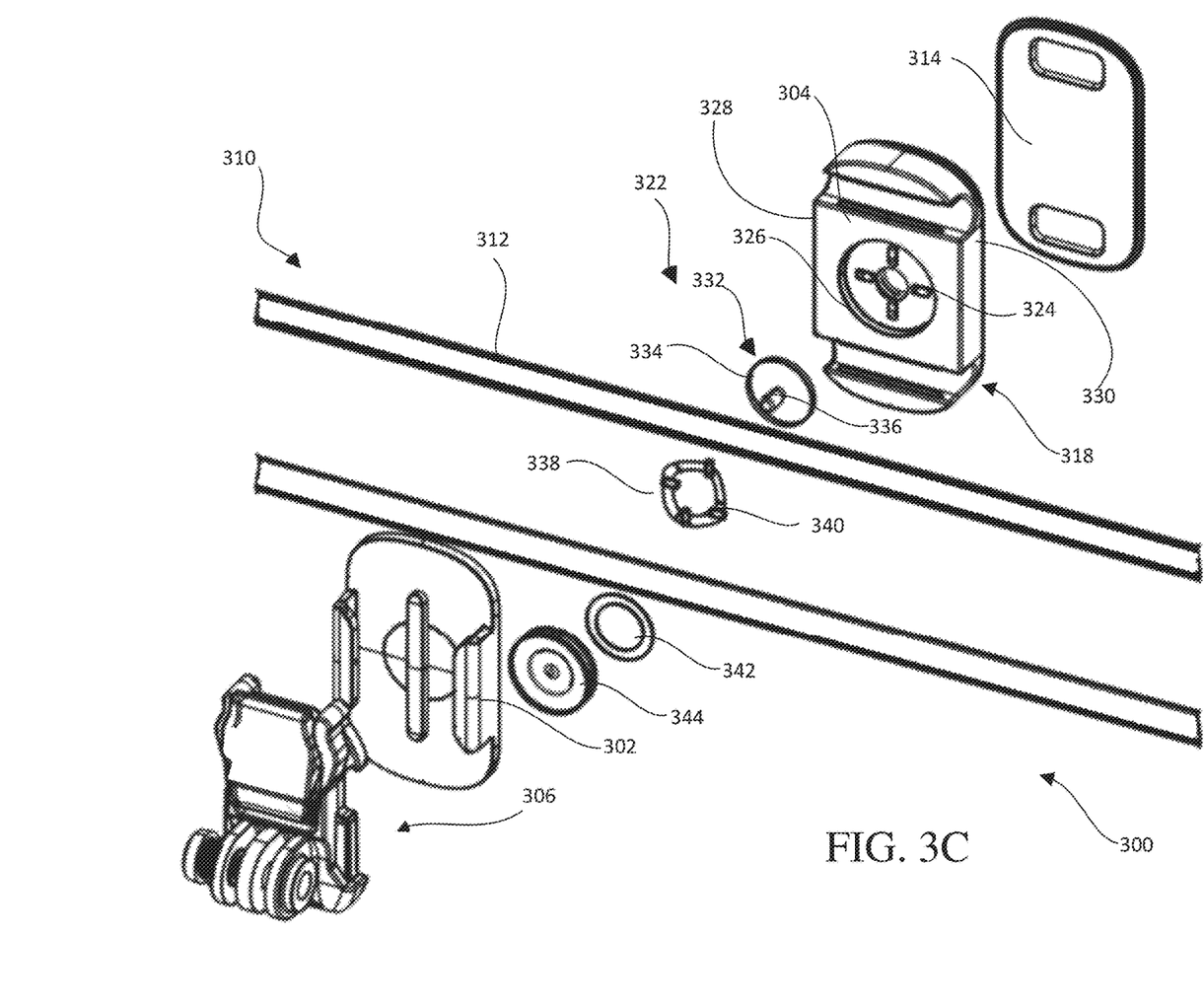
FIG. 3C is a front exploded view of the camera mount and flexible ties of FIG. 3A.
Figure 3D:
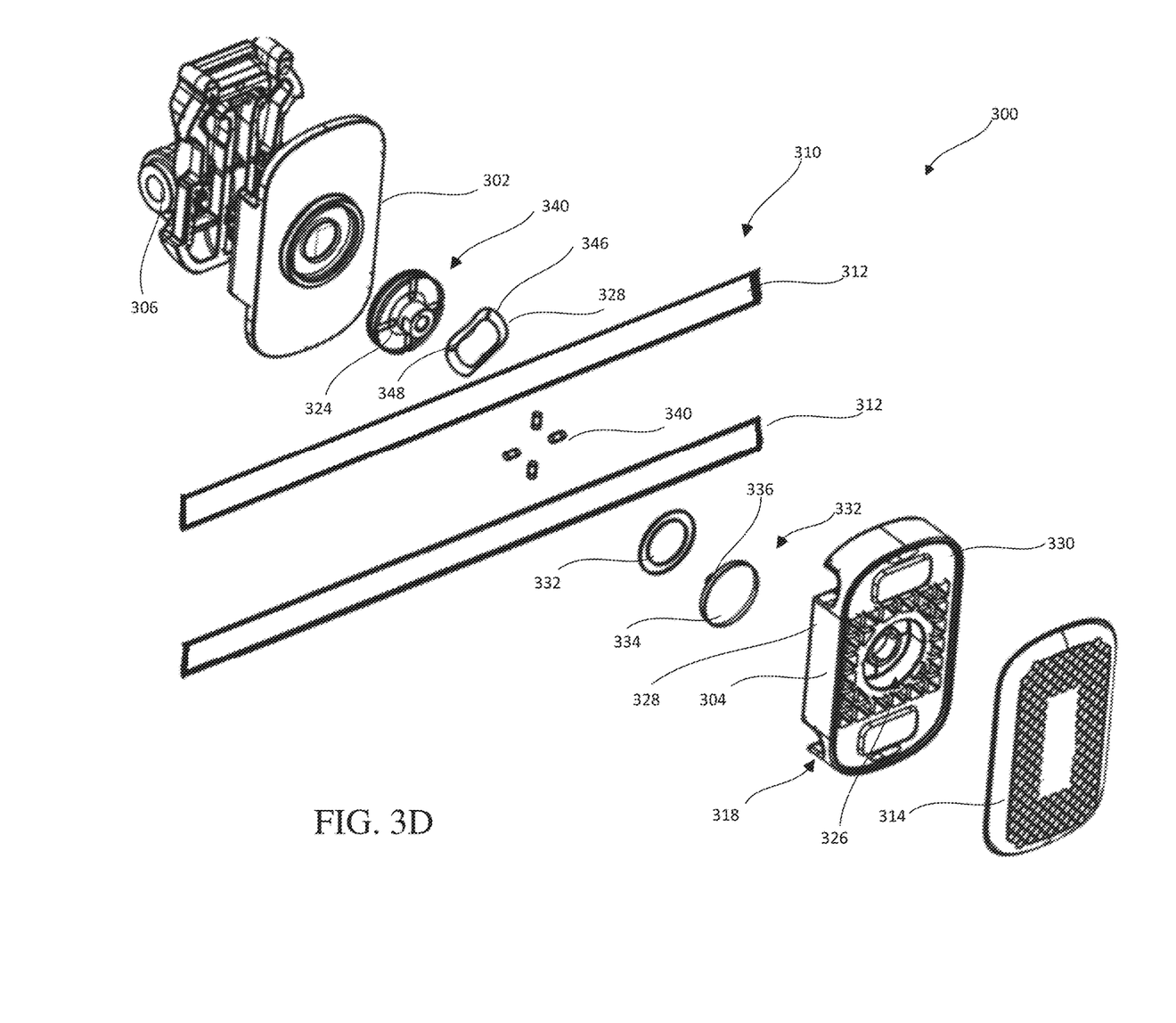
FIG. 3D is a rear exploded view of the camera mount and flexible ties of FIG. 3A.

FIG. 3C is a front exploded view of the camera mount 300 exposing a swivel 322. FIG. 3D is a rear exploded view of another camera mount 300 that is substantially similar to the camera mount 300 of FIG. 3C. The swivel 322 connects the base 302 (including the connector 306) to the bottom 304 (including the surface 314). The swivel 322 permits rotational movement of the base 302 relative to the bottom 304 to expose the recesses 318 and the connection device 310 shown as the flexible members 312. The swivel 322 allows the base 302 and the bottom 304 to move axially, along an axis of the swivel 322, so that a space is formed between the base 302 and the bottom 304 to permit rotation of the base 302 and the bottom 304 relative to one another. The swivel 322 may be fixedly connected to both the base 302 and the bottom 304. The swivel 322 includes indices 324 located within the bottom 304 that provide fixed positions of the base 302 relative to the bottom 304.

The indices 324 functions to lock the camera mount 300 or to inhibit rotational movement of the base 302 relative to the bottom 304. The indices 324 may be detents, recesses, stops, locking positions, or a combination thereof. The indices 324 may be spaced apart a pre-determined distance. The indices 324 may be at a position such that the indices 324 create the locked position 316 (see FIG. 3A) and the unlocked position 320 (see FIG. 3B). The indices 324 may be spaced apart by about 15 degrees or more, about 25 degrees or more, about 45 degrees or more, about 60 degrees or more, about 75 degrees or more, or about 90 degrees. The indices 324 may be spaced apart by about 180 degrees or less, about 165 degrees or less, about 150 degrees or less, about 135 degrees or less, or about 115 degrees or less. The base 302 or the bottom 304 may be free of indices 324. The indices 324 may be located within a cavity 326 on a first side 328 of the bottom 304 or the base 302 and a rivet 332 and a head 334 of the rivet 332 may be located on a second side 330 of the bottom 304 or the base 302 opposite the first side.

The rivet 332 extends into the cavity 326 on the second side 330 and into the cavity 326 on the first side 328. The rivet 332 assists in movably connecting the base 302 to the bottom 304. The rivet 332 restricts the base 302 from being separated from the bottom 304. For example, the rivet 332 permits some axial movement of the base 302 relative to the bottom 304 so that a space is located between the base 302 and the bottom 304 to permit rotational movement. The head 334 of the rivet 332 resides entirely in the cavity 326 on the second side 330. A projection 336 of the rivet 332 extends from the head 334 and the cavity 326 on the second side 330 to and/or toward the first side 328. A bias device 338 is in communication with the head 334, and the projection 336 extends through the bias device 338.

The bias device 338 creates a force against the head 334 of the rivet 332. The bias device 338 creates a force in a direction (e.g., an axial direction) so that the base 302 and the bottom 304 are directed towards one another into a steady state (e.g., the locked position 316). The bias device 338 assists in locking or holding the camera mount 300 in the locked position 316 and the unlocked position 320. The bias device 338 may be any device that generates a force. The bias device 338 may create an axial force (e.g., in a direction along the projection 336). The bias device 338 may be a spring, an elastomeric member, a wave washer, rubber, or a combination thereof. The bias device 338 may be compressed or placed in tension (e.g., store energy) and then release kinetic energy to move the base 302 and bottom 304 towards each other. The bias device 338 may create a force so that the camera mount 300 is moved to a stable position (e.g., one of the positions where indices 324 are located). For example, if there are four indices 324, then the camera mount 300 is quad stable. The bias device 338 may move bearings 340 into the indices 324 or provide a compressive force on the bearings 340 to hold the bearings 340 in contact with the head 334 so that the bearings 340 and indices 324 hold the camera mount 300 in a predetermined position.

The bearings 340 may be any device that permits movement in the unlocked position 320 and restricts movement in the locked position 316. The bearings 340 may be located in the indices 324 in the first side 328 of the bottom 304. A number of bearings 340 may match a number of indices 324. There may be 2 or more, 4 or more, 6 or more, or 8 or more bearings 340. The bearings 340 may have a shape that is round, cylindrical, circular, some shape that is rotatable, or a combination thereof. The bearings 340 may be retained within the indices 324 and may not move during movement. The bearings 340 may rotate within the indices 324 as the base 302 and bottom 304 are moved. The bearings 340 may be held in the indices 324 even when the camera mount 300 is in the unlocked position 320. The bearings 340 may be movable from a first index 324 to a second index 324 while the base 302 and bottom 304 are moved relative to one another. During movement, an axial force may be applied to the bias device 338 that moves the base 302 and the bottom 304 away from each other so that the base 302 and bottom 304 are rotationally movable relative to each other while the bearings 340 rotate within the indices 324. The base 302 and the bottom 304 may be moved a distance to form a space that is substantially equal to a size of the bearings 340. In another example, a user may apply a rotational force to the base 302 and the bottom 304 and the rotational force may cause the bias device 338 to compress and/or expand so that bearings 340 are movable out of the indices 324 while the base 302 and bottom 304 rotate. The bearings 340 may rotate within the indices 324 or move out of the indices 324 during movement as a gasket 342 prevents the bias device 338, the rivet 332, the head 334, or a combination thereof from moving.

The gasket 342 may be in direct contact with a top of the bias device 338. The gasket 342 may prevent the bias device 338 from making noise when the base 302 and bottom 304 are axially moved away from each other, rotationally moved, or both. The gasket 342 may prevent the bias device 338, the swivel 322, or both from rotating or directly contacting one another. The gasket 342 may be made of or include an elastomeric material, rubber, an elastomer, a plastic, a non-metallic material, or a combination thereof. The gasket 342 may be stacked up axially in front of the bias device 338 and the head 334 of the rivet 332. A projection 336 of the rivet 332 extends through the bias device 338 and the gasket 342 into contact with a pivot 344 located on a first side 328 of the bottom 304.

The pivot 344 functions to permit axial movement of the base 302 relative to the bottom 304, rotational movement of the base 302 relative to the bottom 304, or both. The pivot 344 may connect the swivel to the base 302. The pivot 344 may remain static during movement of the camera mount 300. The pivot 344 may receive the projection 336 and the projection 336 may move within the pivot 344 as the base 302 is moved relative to the bottom 304. The pivot 344 may mirror the indices 324 of the bottom 304. The pivot 344 may allow the rivet 332 to move so that the base 302 is movable relative to the bottom 304. The pivot 344 may be locked within the base 302. The rivet 332 may be locked within the bottom 304 and the connection between the rivet 332 and the pivot 344 allows the base 302 and bottom 304 rotate. The pivot 344 may be a bearing or include a bearing surface. For example, the pivot 344 may be maintained in a static position but the projection 336 may be rotatable within the pivot 344.

FIG. 3D is substantially identical to FIG. 3C, except that the head 334 of the rivet 332 includes the indices 324 that receive the bearings 340. The bearing 340 is connected to the base 302 and the rivet 332 is connected to the bottom 304. The projection 336 of the rivet 332 extends into a hole within the bearing 340 to connect the bearing 340 and the rivet 332 together so that the base 302 and the bottom 304 are movably connected. The bias device 338 contacts the bearings 340 to move the bearings 340.

The bias device 338 includes peaks 346 and valleys 348. The valleys 348 may receive the bearings 340. The bias device 338 may be in a steady state or at rest when the bearings 340 are located within the valleys 348. The bearings 340 may move with the bias device 338 as the base 302 moves relative to the bottom 304. For example, the bearings 340 may be moved out of the indices 324 during movement. In another example, the bearings 340 may rotate within the indices 324 and the bias device 338 may rotate such that the bearings 340 are passed from a first valley 348 past a peak 346 and into a second valley 348.

Figure 3E:
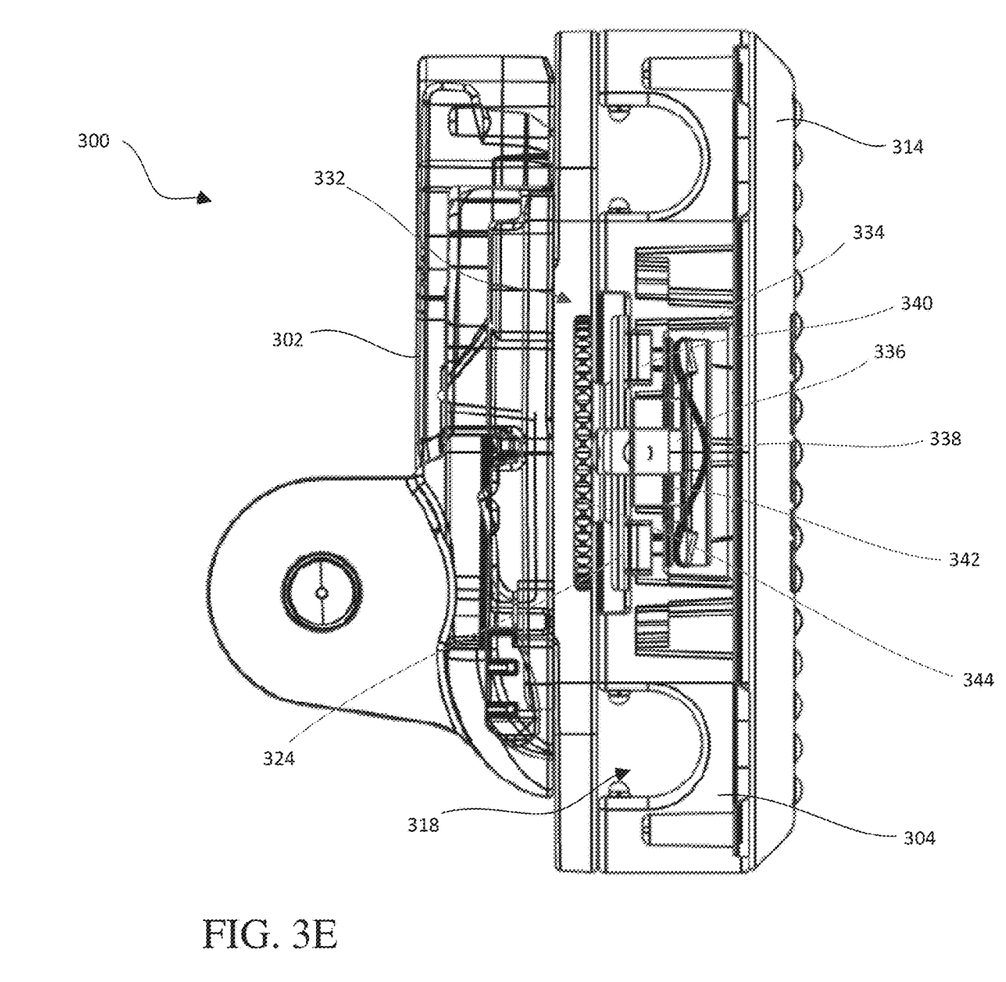
FIG. 3E is a cross sectional view of the camera mount of FIG. 3A.

FIG. 3E is a cross-sectional view of the camera mount 300 of FIG. 3A along lines IIIE-IIIE. An outside of the camera mount 300 includes the base 302 and the bottom 304. The base 302 includes the pivot 344 and the bottom 304 includes the rivet 332. The rivet 332 includes a head 334 that is connected to the bottom 304 and the rivet 332 includes a projection 336 that extends into the pivot 344 connected to the base 302. The bias device 338 retains bearings 340 in communication with the indices 324 within the pivot 344. The gasket 342 extends between the bearings 340 and the bias device 338 to retain the bearings 340 within the indices 324. The gasket 342 retains the bearings 340 within the indices 324 so that the recesses 318 are closed as shown by the base 302 covering the bottom 304. The bottom 304 includes the surface 314 that restricts movements of the camera mount 300 when the camera mount 300 is connected to a surface (not shown).

Figure 3F:
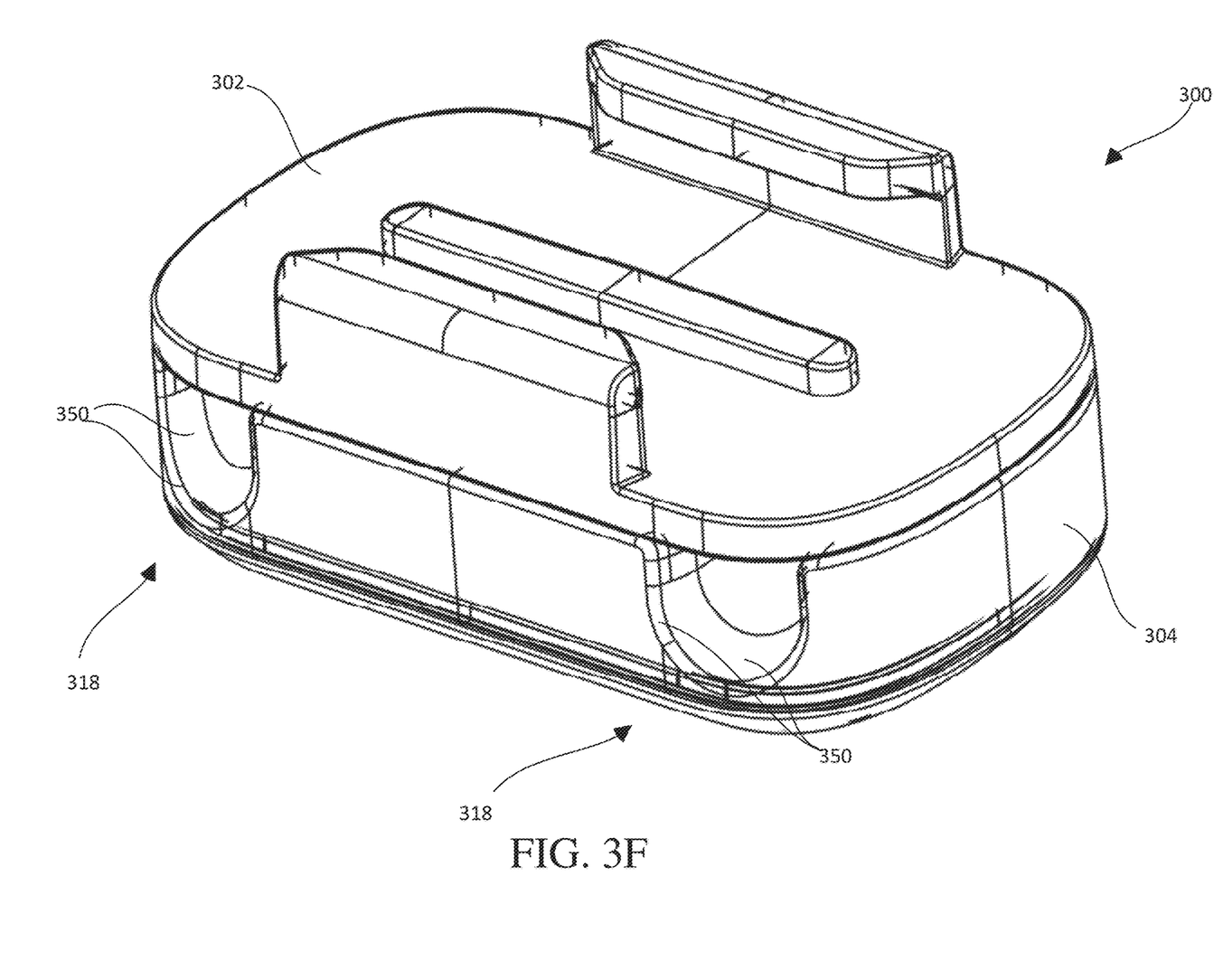
FIG. 3F is an isometric view of a camera mount with a relief.

FIG. 3F is an isometric view of the camera mount of FIG. 3A with reliefs 350 added to the recesses 318. The recesses 318 and reliefs 350 are located between the base 302 and the bottom 304. The reliefs 350 may remove stress on the flexible members 312 shown in FIGS. 3A-3D. The reliefs 350 may a radius of bend of the flexible members 312 so that as the flexible members 312 bend, there is gradual change in bend. For example, without the reliefs 350 a forward wall of the bottom 304 may form a 90 degree angle with an interior of the recesses 318. The reliefs 350 may create an arc between an interior of the recess 318 and an outer wall of the bottom 304. The reliefs 350 may have a arcuate bend (e.g. arc length) of about 0.01 or more, about 0.5 mm or more, or about 1 mm or more. The reliefs 350 may have an arcuate bend of about 10 mm or less, about 5 mm or less, or about 3 mm or less. The reliefs 350 may have an arc length of about 5 degrees or more, about 10 degrees or more, about 15 degrees or more, or about 20 degrees or more. The reliefs 350 may have an arc length of about 35 degrees or less, about 30 degrees or less, or about 25 degrees or less. The reliefs 350 may permit bending but reduce stress so that the flexible members 312 (not shown) are not damaged or stressed. Each end of the recesses 318 may include a relief 350. Each recess 318 may include two reliefs 350. The reliefs 350 may be a single curve or multiple curves so that the recess 318 has multiple changes in shape.

Figure 4A:
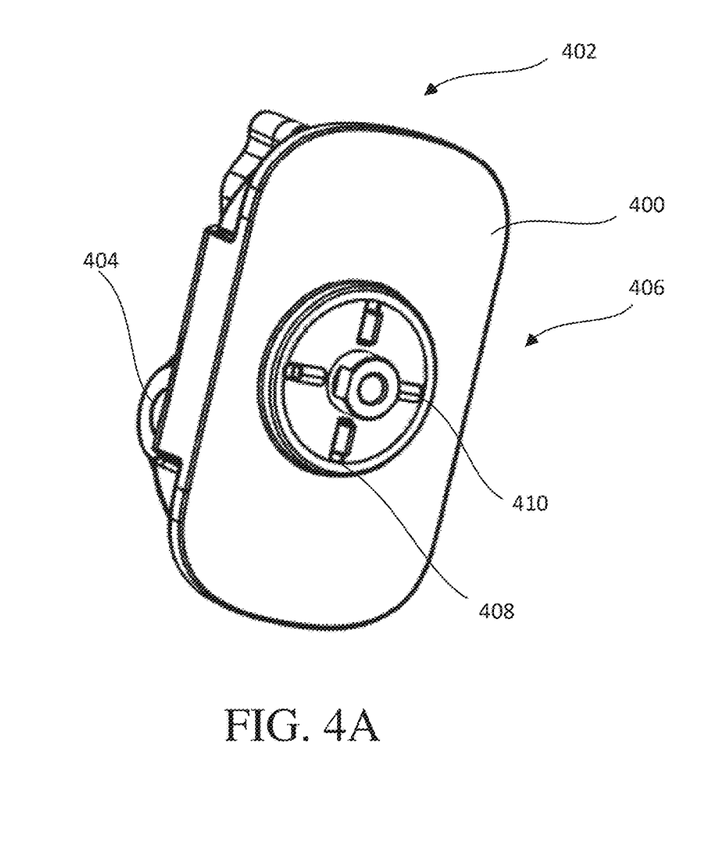
FIG. 4A is a perspective view of the base of FIG. 3A with an indexed swivel.

FIG. 4A is an isometric view of a base 400. A rear side of the base 400 includes a connector 402 including a protrusion 404 that connects to another device (not shown) such as a gimbal, tripod, vehicle, bicycle, helmet, or a combination thereof. A front side of the base 400 includes a swivel 406. The swivel 406 includes indices that receive bearings 410 that determine a steady state of a bottom (not shown) when rotated by a user. The bearings 410 are biased to seek the swivels 406 when the bearings 410 are moved out of the indices 408. The bearings 410 may be maintained within the indices 408 and rotate relative to a bias device (not shown). The bias device may include troughs and peaks and the bias device may rotate until the bearings 410 fall within a trough.

Figure 4B:
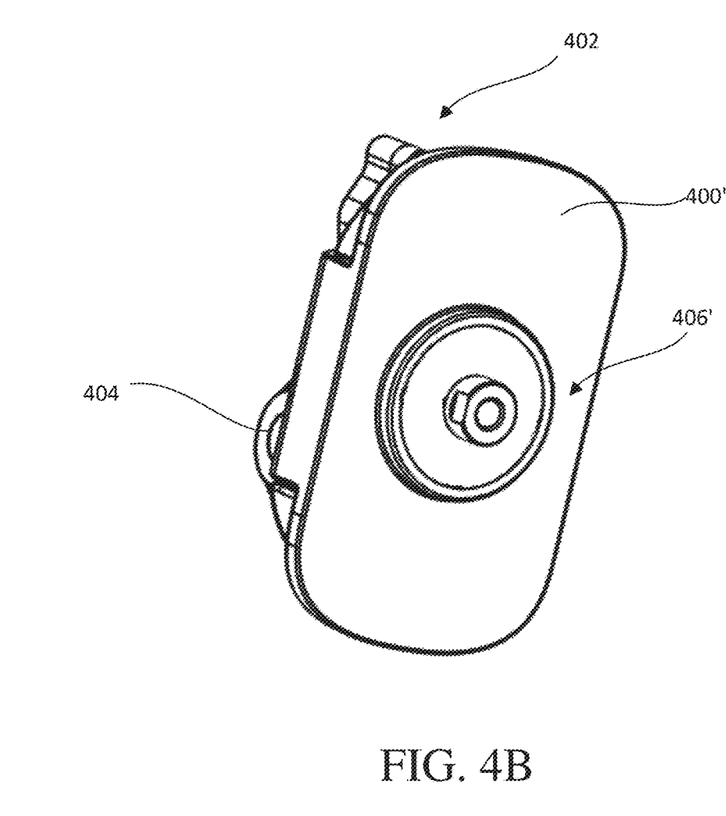
FIG. 4B is a perspective view of the base of FIG. 3A without an indexed swivel.

FIG. 4B is an isometric view of a base 400'. A rear side of the base 400' includes the connector 402 and the protrusion 404 that connects the base 400' to another devices (not shown). A front side of the base 400' includes a swivel 406'. The swivel 406' is free of indices and is smooth so that bearings (not shown) may rotate into virtually any position or into indices in another member (not shown).

Figures 5A, 5B:
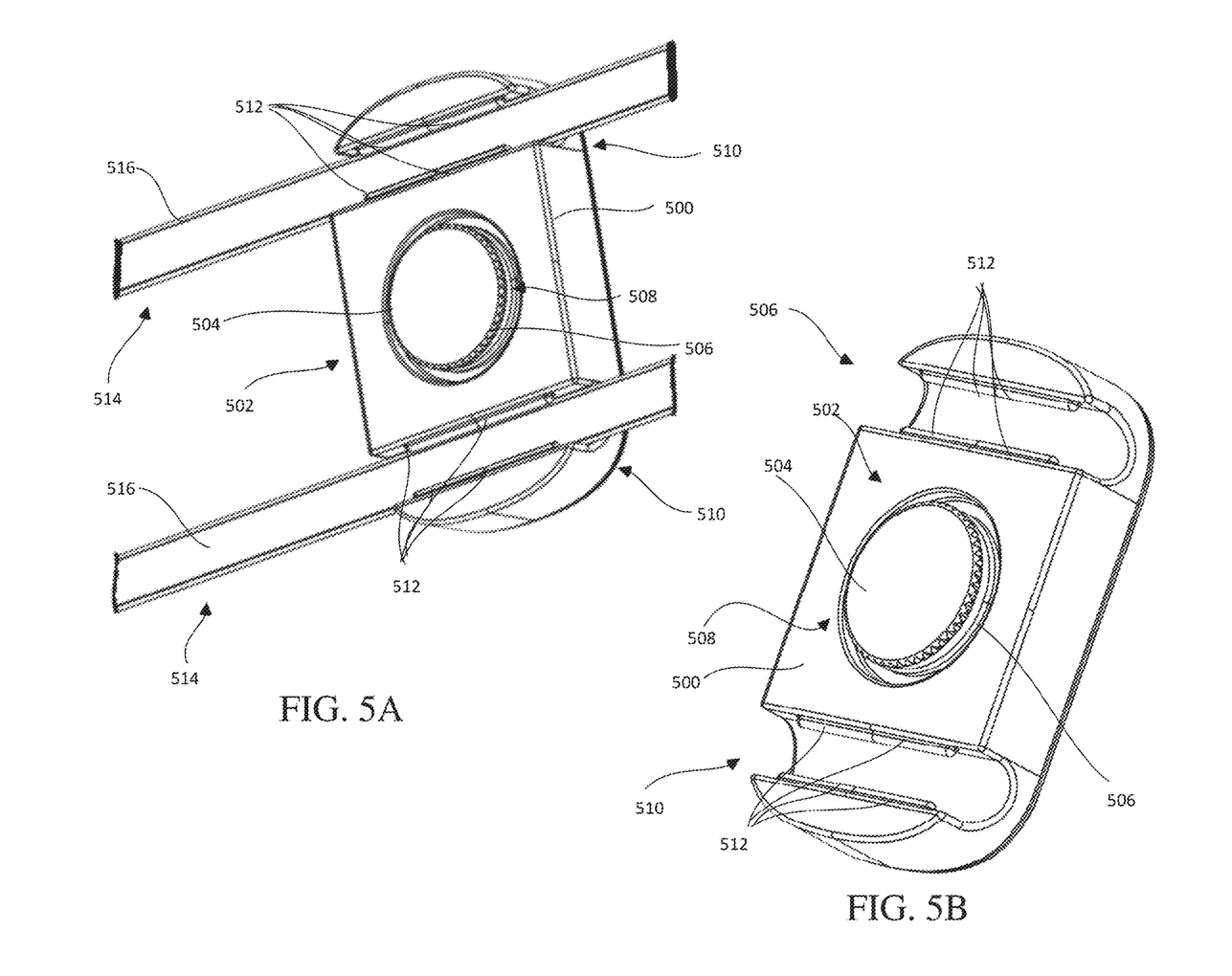
FIG. 5A is a perspective view of the bottom of FIG. 3B with flexible ties.
FIG. 5B is a perspective view of the bottom of FIG. 3B with the flexible ties removed.

FIG. 5A is a front isometric view of a bottom 500. The bottom 500 includes a swivel 502. The swivel 502 may be a mechanism that connects the bottom 500 to the base 400, 400' so that the bottom 500 is rotatable relative to the base 400, 400'. The swivel 502 may permit axial movement, rotational movement, or both of the bottom 500 and the base 400, 400' relative to one another. The swivel 502 may be a single part. The swivel 502 may be a combination of multiple parts. The swivel 502 may include a pivot 504 that is connected to the base 400, 400' and a rivet 506 that is connected to the bottom 500.

The rivet 506 is moveably connected to the pivot 504. The rivet 506 and the pivot 504 are axially movable, rotationally movable, or both. The rivet 506, the pivot 504, or both may extend fully or partially into a cavity 508. The cavity 508 may countersink the swivel 502. The cavity 508 may permit rotation of the pivot 504, the rivet 506, or both. The cavity 508 may receive the swivel 502 so that when the bottom 500 are the base 400, 400' are in a closed position the recess 510 is closed.

The recesses 510 include locks 512 that receive a connection device 514. The recesses 510 may be parallel to one another. Each recess 510 includes one connection device 514. The recesses 510 may counter sink the connection devices 514 so that the base 400, 400' is rotatable over the recesses 510 and the connection devices 514 to prevent the connection devices 514 from being removed from the recesses 510, contacted during movement, or both. The recesses 510 may include locks 512.

The locks 512 prevent axial movement of the connection devices 514 along a length of the connection devices 514, the connections devices 514 from being pulled out of the recesses 510, or both. The locks 512 may grip individual ones of the connection devices 514 so that the connection devices 514 are retained with the recesses 510. The locks 512 may be rigid. For example, the connection device 514 may deform so that the connection device 514 may extend into the recesses 510. The locks 512 may be able to be biased or are otherwise flexible so that the locks 512 move as the connection device 514 is inserted into the recess 510. When the connection device 514 is inserted in into the locks 512, the locks 512 may assert a force on the connection device 514 to hold the connection device 514 in place. The force may be sufficiently large to prevent axial movement of the connection device 514 or an orthogonal movement of the connection device 514. The locks 512 may be spring loaded, rubber, an elastomeric material, or a combination thereof. The locks 512 may be made of the same or a similar material as the connection device 514 so that friction between the locks 512 and the connection device 514 restrict movement of the connection device 514.

The connection devices 514 function to connect the camera mount 300 and an image capture device 100, 200 to a structure (not shown). The connection devices 514 may extend through the recesses 510 in the camera mount 300 so that the camera mount 300 may be removably connected to the structure. The connection devices 514 may conform to a shape of a structure. The connection devices 514 may connect to an irregularly shaped structure. The connection device 514 may be or include a flexible material, rubber, an elastomer, silicone, metal, steel, iron, spring steel, nitinol, a coated metal, or a combination thereof. The connection device 514 may be a flexible member 516.

The flexible member 516 may be rigid enough to support a mass but flexible enough to conform to a shape of support. The flexible member 516 may have a first end and a second end that may be twisted together to connect the flexible member and the camera mount 300 to a support. The flexible member 516 may connect to itself. The flexible member 516 may connect to other structures. For example, the flexible member 516 may connect to a fence by the flexible member 516 extending around the fence. The flexible members 516 may support the camera mount 300 and image capture devices 100, 200. The flexible members 516 may be reusable. The flexible members 516 may be a single use. For example, a zip tie may be used to connect the camera mount 300 to a structure.

FIG. 5B illustrates the bottom 500 of FIG. 5A with the connection devices 514 removed from the recesses 510. The locks 512 extend from opposing walls of the recesses 510 towards a center of the recesses 510. The locks 512 form a gap that is smaller than a size of the flexible members 516 so that a friction fit is formed between the locks 512 and the flexible members 516. The locks 512 may hold the flexible members 516 into contact with a base of the recesses 510.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A camera mount, comprising:
a base; and
a bottom rotatably connected to the base at a pivot point including a rotational axis that extends through the base and the bottom,
wherein the bottom includes recesses configured to receive flexible fasteners; and
wherein the bottom and the base are movable to a closed position where the recesses are inaccessible and the flexible fasteners are held between the base and the bottom and an open position where the bottom is rotated about the pivot point to expose the recesses so that the flexible fasteners are at least one of insertable, removable, or interchangeable while the base and the bottom remain in communication.

2. The camera mount of claim 1, wherein the camera mount may be located at any location along a length of the flexible fasteners.

3. The camera mount of claim 1, wherein the base and the bottom are connected by a swivel located at the pivot point so that the base and the bottom rotate about the pivot point via the swivel.

4. The camera mount of claim 3, wherein the swivel comprises a rivet and a pivot configured to permit the base and the bottom to rotate about the rotational axis.

5. The camera mount of claim 4, wherein the pivot includes a head and a projection, wherein the projection extends from the head, along the rotational axis, into contact with the pivot to movably connect the pivot to the rivet.

6. The camera mount of claim 1, further comprising a bias device located between the base and the bottom, wherein the bias device biases the base relative to the bottom.

7. The camera mount of claim 6, wherein the bias device moves the base towards the bottom.

8. A camera mount, comprising:
a base; and
a bottom extending parallel to the base, wherein the bottom is rotatably movable about a rotational axis that extends through the base,
wherein the bottom comprises:
recesses configured to receive flexible fasteners; and
locks configured to restrict movement of the flexible fasteners relative to the recesses; and
wherein the bottom and the base are movable between an open position where the recesses are exposed and a closed position wherein the recesses are covered, and
wherein the bottom and the base overlap and are parallel in the open position and the closed position.

9. The camera mount of claim 8, wherein the locks are flexible and flex to permit the flexible fasteners to be inserted into the recesses and contact the flexible fasteners to restrict the movement of the flexible fasteners.

10. The camera mount of claim 8, further comprising a swivel located between and connecting the base and the bottom together.

11. The camera mount of claim 8, wherein the bottom includes indices that stop the base and the bottom at predetermined positions relative to one another.

12. The camera mount of claim 11, wherein the indices are depressions that are configured to receive bearings.

13. The camera mount of claim 12, wherein the bearings are cylindrical and are rotatable within the indices or are rotatable from a first index to a second index as the base and the bottom are moved relative to one another.

14. The camera mount of claim 12, further comprising a bias device that is located over the indices to retain the bearings within the indices.

15. A camera mount, comprising:
a base;
a bottom;
a swivel located between the base and the bottom, wherein the swivel permits movement of the base and the bottom about a rotational axis that extends through the base, the bottom, and the swivel;
recesses located within the bottom, wherein the recesses are configured to receive flexible fasteners when the camera mount is in an open position and to lock the flexible fasteners in the recesses when the camera mount is in a closed position;
wherein the recesses extend along opposing sides of the swivel and are exposed when the camera mount is in the open position and sandwiched between the base and the bottom when the camera mount is in the closed position.

16. The camera mount of claim 15, wherein the swivel comprises a rivet and a pivot that connect the base and the bottom together.

17. The camera mount of claim 16, wherein the rivet is connected to the bottom and the swivel is connected to the base.

18. The camera mount of claim 16, wherein the swivel includes a projection that extends into contact with the swivel and permits axial movement along of the base and the bottom relative to one another along a length of the projection, rotational movement of the base and the bottom relative to one another about the projection, or both.

19. The camera mount of claim 16, further comprising a bias device located between the rivet and the pivot to bias the rivet and pivot relative to one another.

20. The camera mount of claim 19, further comprising a gasket located between the bias device and the pivot.

* * * * *